United States Patent [19]

Osanai

[11] 3,820,148

[45] June 25, 1974

[54] MOTOR DRIVE DEVICES FOR CAMERAS

[75] Inventor: Akira Osanai, Tokyo, Japan

[73] Assignee: Olympus Optical Co., Ltd., Tokyo, Japan

[22] Filed: June 13, 1973

[21] Appl. No.: 369,701

[30] Foreign Application Priority Data
June 16, 1972 Japan.............................. 47-71285
Oct. 28, 1972 Japan............................ 47-123845

[52] U.S. Cl.............................354/295, 95/86
[51] Int. Cl. ......................................... G03b 19/04
[58] Field of Search ......... 95/31, 86; 352/174, 166, 352/197

[56] References Cited
UNITED STATES PATENTS
2,928,315  3/1960  Broido .................................. 95/86
3,187,341  6/1965  Kubota .............................. 352/174
3,710,705  1/1973  Kimura ................................. 95/31

Primary Examiner—John M. Horan
Attorney, Agent, or Firm—Flynn & Frishauf

[57] ABSTRACT

A motor drive device is attached to the camera to automatically drive a film windup mechanism and shutter releasing mechanism. The device has two connected casings, one receiving a motor and the other receiving a drive unit. The motor casing is located on the front right side of the camera and used as a grip for holding the camera. The drive unit may drive both mechanisms in turn and is conveniently in a predetermined timing period.

14 Claims, 11 Drawing Figures

MOTOR DRIVE DEVICES FOR CAMERAS

BACKGROUND OF THE INVENTION

This invention relates to a motor drive device attached to a camera to automatically windup a roll film and to release a shutter.

Such a motor drive device is usually attached to the bottom surface of a conventional camera through a tripod bush or socket. The conventional motor drive device is of a relatively large size and heavy weight, so that the assembly of the camera and such a device is also heavy and is of a shape not suitable for manual operation. Further the device is inevitably of a complicated construction for obtaining an accurate operation.

Accordingly an object of the present invention is to provide a motor drive device which may be designed to have a light weight and a shape suitable for manual operation.

Another object of the invention is to provide a motor drive device which accurately operates a shutter releasing mechanism and a film windup mechanism in a predetermined interval.

SUMMARY OF THE INVENTION

According to the present invention, a motor drive device for a camera with a film windup mechanism and a shutter releasing mechanism includes a casing having a main casing and a motor casing, the main casing being attachable to the bottom surface of the camera and the motor casing being disposed on one side of the front surface of the camera and extending along the side edge of the front surface. The motor casing is conveniently adapted to be grippable with the camera by hand to improve handling. A motor is received in the motor casing, and a drive unit is accommodated in the main casing. The drive unit includes a sun gear rotated by the motor, a planet gear meshed with the sun gear to rotate about its own axis and to also revolve around the sun gear, a first means temporarily associated with the planet gear to drive the film windup mechanism of the camera, and a second means temporarily associated with the planet gear to drive the shutter releasing mechanism of the camera. The second means may become temporarily associated with the planet gear after the operation of the film windup mechanism, as desired.

DESCRIPTION OF PREFERRED EMBODIMENTS

Figure 1:
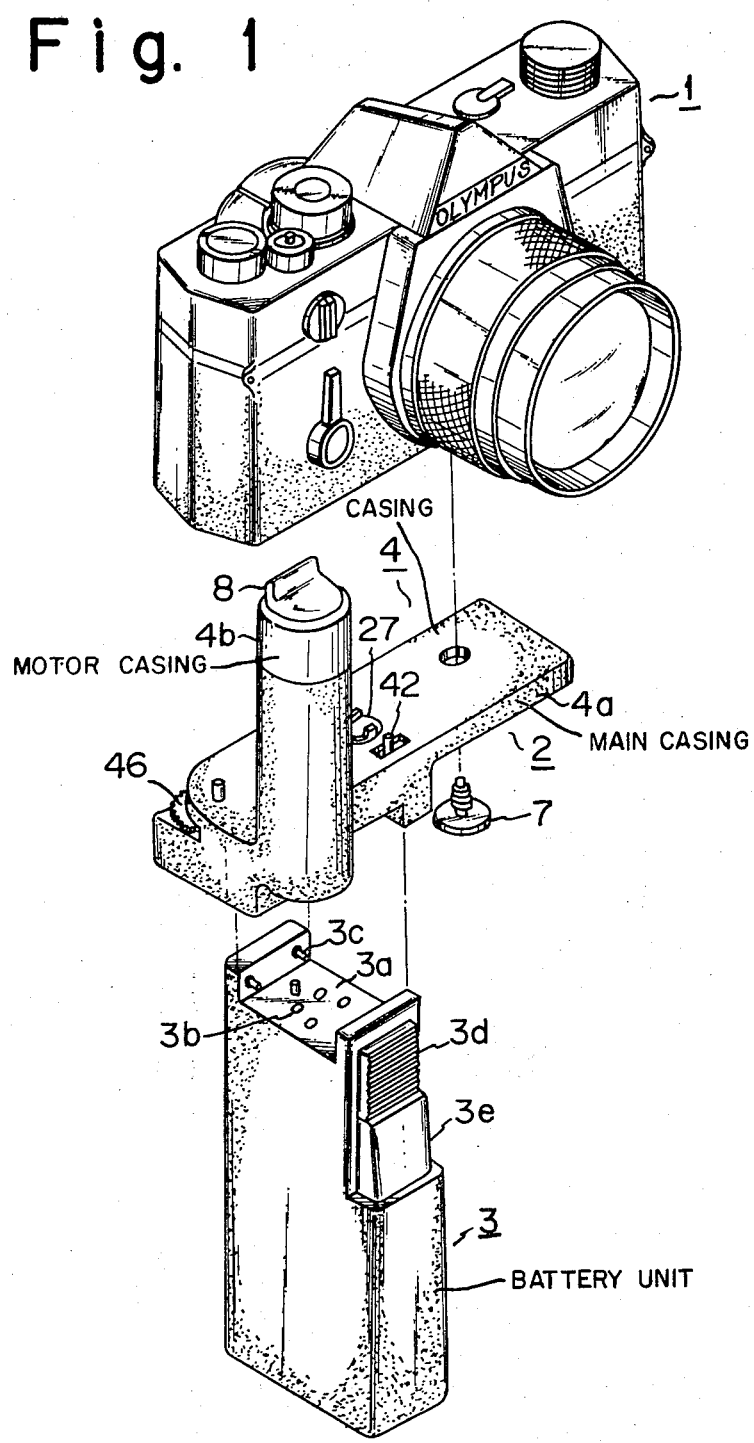
FIG. 1 is a perspective view of a motor drive device with a battery unit attached to a camera, of an embodiment according to the present invention.

In FIG. 1, numeral 1 denotes a conventional 35 mm single lens reflex camera, numeral 2 a drive unit and numeral 3 a battery unit. The camera 1 has a tripod screw hole in the bottom surface in which a tripod bush or socket is screwed. On the bottom surface of the camera is provided a film windup joint which is operatively connected to a motor drive device and a hole receiving a pin of a shutter releasing lever. The battery unit 3 comprises a battery and a main part of an electric control circuit. At the top of the battery unit 3 is formed an attaching means to the drive unit 2. The attaching means includes a recess 3a into which the drive unit 2 is to be fitted, electric contacts 3b mounted on the bottom of the recess 3a to be electrically connected to the electric circuit in the battery unit 3 and engaging pins 3c slidably inserted in holes formed in the opposing sidewalls of the recess 3a. The pins 3c are normally held extended from the holes to engage the drive unit 2, so that the drive unit 2 is securely fixed on the battery unit 3. This engagement may be released by pushing a button 3d mounted on the sidewall of the battery unit 3. On this sidewall there is further provided a push button 3e for operating a shutter releasing switch.

Figure 2:
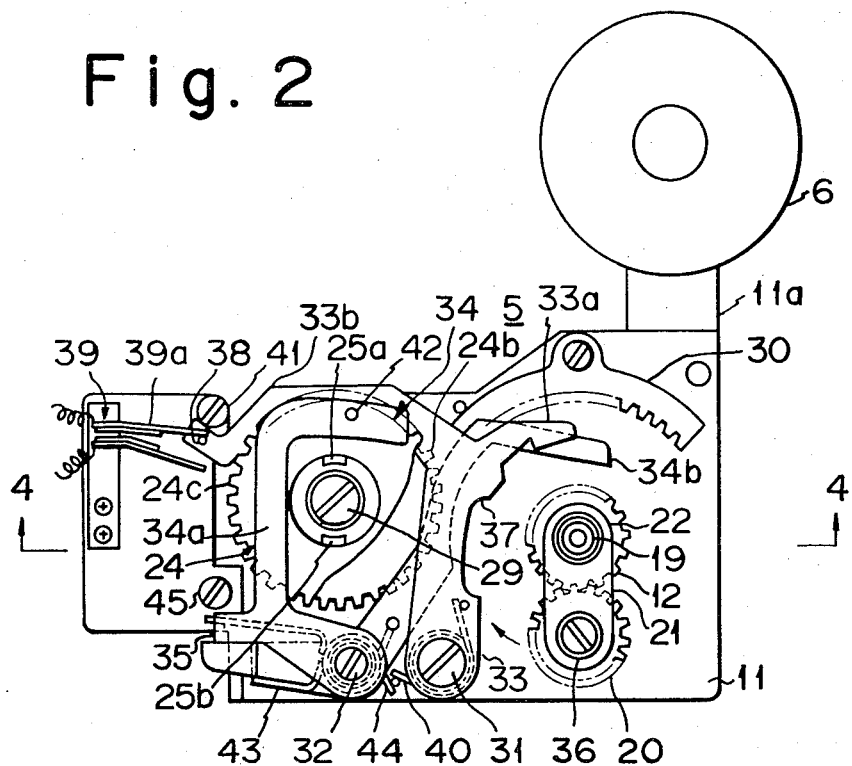
FIG. 2 is a plane view of the drive unit of the motor drive device.
Figure 3:
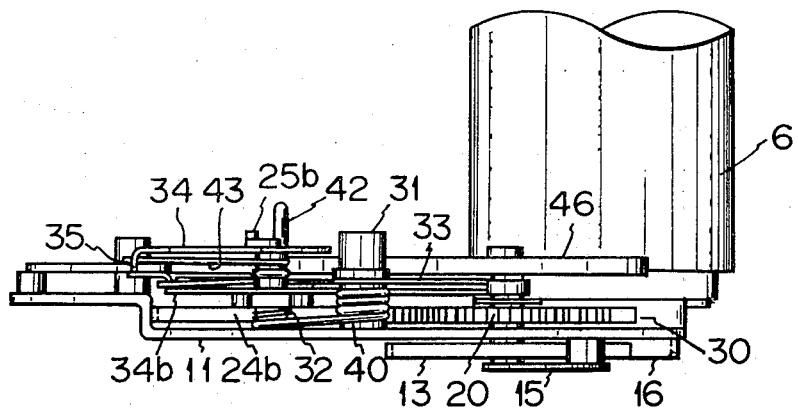
FIG. 3 is a side view of the drive unit.
Figure 4:
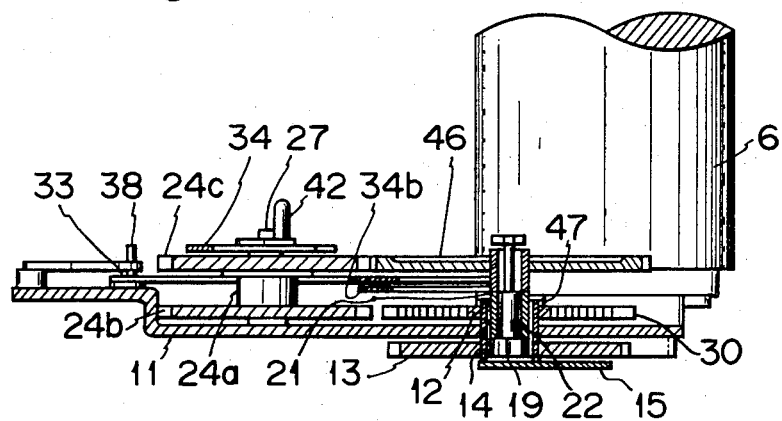
FIG. 4 is a sectional view of the drive unit along a line 4 — 4 of FIG. 2.

The drive unit 2 has a casing 4 in which a drive mechanism 5 and a motor 6 are mounted as shown in FIGS. 2 to 4, which can be attached to the bottom surface of the camera 1 by screwing a bolt 7 into the tripod bushing or screwed hole provided in the bottom surface thereof. As shown in FIG. 1, the casing 4 is constituted by a main casing 4a having a flat surface preferably of the same rectangular shape as the bottom surface of the camera 1 and a cylindrical motor casing 4b extending upwardly from the front side of the main casing 4a in such a manner that it faces the front right side edge portion of the camera 1 with a small spacing when the drive unit 2 is attached to the camera 1. The drive mechanism 5 (FIG. 2) is accommodated in the main casing 4a while a dc-motor 6 of cylindrical shape is received in the motor casing 4b. The motor casing 4b further contains a shutter releasing switch at the top portion, of which an operating button 8 projects upwardly extended from the top surface of the motor casing 4b. The drive mechanism 5 is mounted on a base plate 11 and the dc-motor 6 on a portion 11a forwardly extending from the forward right end of the plate 11, the rotary shaft of the motor being downwardly projected.

Figure 5:
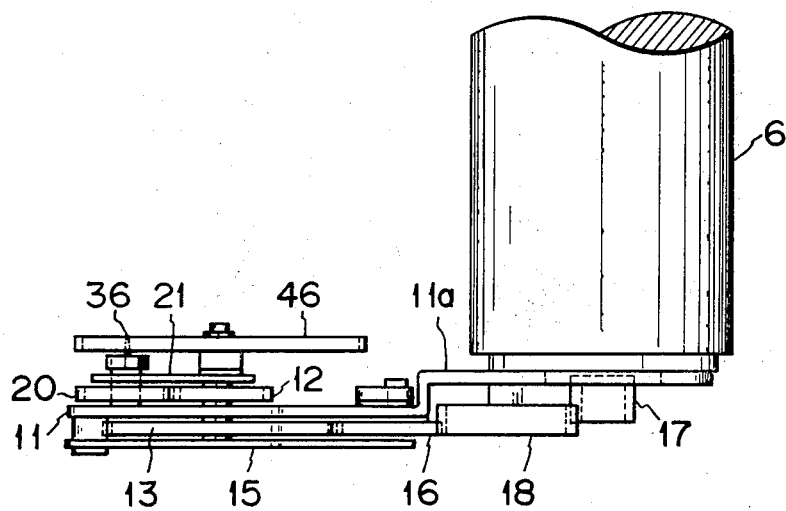
FIG. 5 is a front view of the drive unit.
Figure 6:
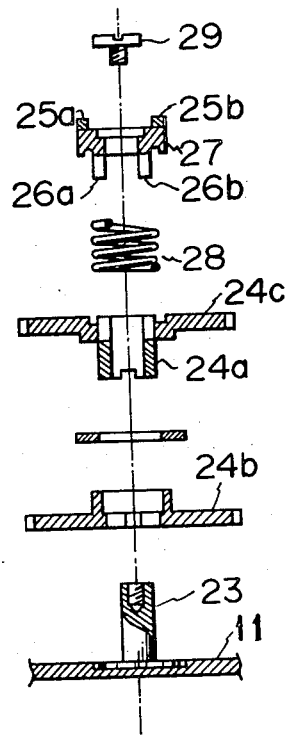
FIG. 6 is an exploded sectional view of the drive gear assembly for operating a film windup mechanism of a camera.

As shown in FIG. 5, a drive gear 12 is rotatably mounted on the upper side of the base plate 11 near the right end thereof and connected to a large transmission gear 13 provided on the lower side of the base plate 11 through a sleeve 14 rotatably penetrating through the plate. The gear 13 is covered with an auxiliary base plate 15 located near the lower surface of the main plate 11. Both plates 11 and 15 rotatably support a small transmission gear 16 therebetween. Another transmission gear 18 is rotatably mounted on the lower side of the extended portion 11a to mesh with the small gear 16. This gear 18 is also meshed with a small drive gear 17 fixed on the rotary shaft of the motor 6. Accordingly, the motor 6 allows the drive gear 12 to rotate at a slower speed than the motor shaft through this gear train.

As shown in FIG. 4, from the auxiliary plate 15 is upwardly extending a shaft 19 coaxially inserted in the sleeve 14. On the upper side of the base plate 11 a planet gear 20 is meshed with the drive or sun gear 12 as shown in FIG. 2. The planet gear 20 is rotatably supported at one end of a connecting lever 21. Through the lever at the other end is penetrated an inner sleeve 22 with its lower portion coaxially extending into a cylindrical space defined by the shaft 19 and outer sleeve 14. A friction ring 47 is disposed between the top flange of the inner sleeve 22 and the drive gear 12 to frictionally contact them, so that the rotation of the sleeve 12 is positively transmitted to the gear 12 through the friction ring 47 in a normal condition. It should be noted that the frictional ring 47 may be omitted when the inner sleeve 22 is in frictional contact with the outer sleeve 14 at the peripheral surface. On a smaller diameter top portion of the shaft 19 is rotatably mounted a film back drive gear 46 of a large diameter. The large gear 46 is partially extended from an opening formed in the upper right corner of the main casing 4a, the exposed part of a few teeth of the gear 46 being capable of meshing with the gear of a film windup mechanism mounted in the camera 1.

On the left side of the upper surface of the base plate 11 is positioned a shaft 23 which lies on the outside of the orbit of the planet gear 20. On the shaft 23 is rotatably mounted a gear assembly 24 for driving a film windup mechanism. The assembly 24 is constructed by two gears 24b and 24c vertically separated through a sleeve portion 24a. The upper gear 24c is always meshed with said large gear 46 and the lower gear 24b may be temporarily meshed with the planet gear 20. A cylindrical film windup joint 27 is coaxially mounted on the upper gear 24c, through which the shaft 23 is inserted. The joint 27 is provided with a pair of engaging projections 25a, 25b which project from the upper end thereof and face each other. From the lower end of the joint are extended a pair of connecting projections 26a, 26b to face each other. A coil spring 28 is interposed between the lower end of the cylindrical joint 27 and the upper surface of the upper gear 24c. In the assembling operation, the shaft 23 is inserted in the lower gear 24b, upper gear 24c with the cylinder 24a, coil spring 28 and in the cylindrical joint 27, and then a bolt 29 is screwed into a screw hole formed in the top of the shaft 23 in such a manner that the coil spring is compressed between the joint 27 and the upper gear 24c. The engaging projections 25a, 25b of the joint 27 are outwardly projected from an opening formed in the main casing 4a.

On the base plate 11 near the drive gear 12 is provided a toothed arc plate 30 which is meshed with the planet gear 20. The arc plate 30 is pivoted on the base plate 11 at the center to be swingable thereabout. On the rear portion of the plate 11 are raised up two pins 31 and 32 juxtaposed to each other with a prescribed spacing. The right side pin 31 rotatably carries the base portion of an engaging lever 33 for operating a clutch, and the left side pin 32 pivots a lever assembly 34 for operating a shutter releasing mechanism. The shutter releasing lever assembly 34 is constructed by a shutter releasing lever 34a and an operating lever 34b. The shutter releasing lever 34a is pivoted on the pin 32 at the base portion and the operating lever 34b at the center portion, these pivoted portions being overlapped. Said engaging lever 33 is of a Y-shape with one arm 33a extended to cross the orbit of the planet gear 20 and the other arm 33b stretched outside the gear assembly 24 through between the upper and lower gears 24c and 24b. The lever 33 has a cut away portion 37 in the base portion on the side facing the drive gear 12. This cut away portion 37 engageably receives an engaging protrusion of a roller 36 projecting from one end of the lever 21 connected to the planet gear 20. The cut away portion 37 is so formed that it engages the roller 36 in synchronism with the meshing of the planet gear 20 with the lower gear 24b. A pin 38 is planted in the extended end of the arm 33b which may selectively operate a movable contact 39a of a switch 39 mounted on the base plate 11 on the left side thereof. A torsion spring 40 is attached to the base portion of the engaging lever 33 to urge it in a clockwise direction in FIG. 2. This clockwise rotation of the lever 33 is limited by contacting the extended end of the arm 33b with a pin 41 mounted on the base plate 11. The shutter releasing lever 34a is extended over the film windup gear assembly 24 and its extended end portion is horizontally bent to the right along the cylindrical joint 27. A pin 42 for releasing a shutter is upwardly projected from the bent end portion of the lever 34a, which is extended from a slit formed through the upper wall of the main casing. One end of the lever 34b is extended to cross the orbit of the planet gear 20 and the other end is engaged with a tongue portion 35 downwardly bent from the end of the lever 34a. A torsion spring 43 is attached between the tongue portion 35 and the other end of the lever 34 for elastically connecting them. Another torsion spring 44 is provided on the lever 34b to urge the lever assembly 34 in a clockwise direction. This rotation is limited by abutting the tongue 35 onto the stop pin 45 mounted on the base plate 11.

The drive unit of the arrangement described is operated as follows.

Figure 9:
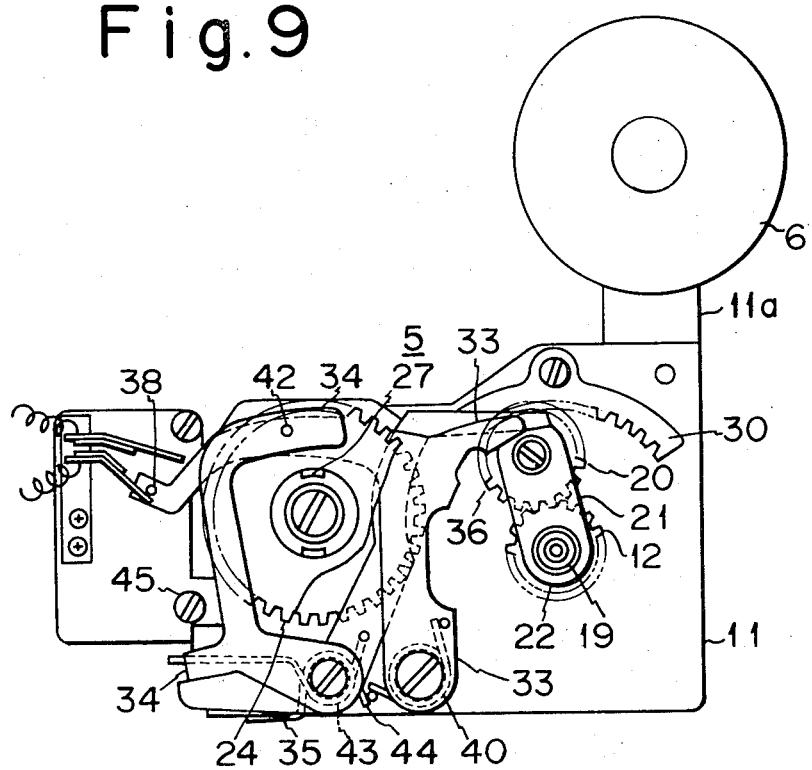
FIG. 9 is a plane view of the drive unit similar to the one shown in FIG. 2, except that a shutter releasing mechanism is driven.

In a condition that the planet gear 20 is apart from the engaging lever 33 and arc plate 30 with the internal gear, as shown in FIG. 2, when the button switch 3e or 8 is pushed to drive the motor 6, the drive gear 12 is rotated to allow the planet gear 20 to be simultaneously rotated and revolved around the gear 12 in a clockwise direction shown by an arrow in FIG. 2. The revolution of the planet gear 20 continues until the engaging roller 36 connected therewith engages the recess 37 formed in the lever 33 and simultaneously the planet gear 20 is meshed with the lower gear 24b to start it rotating. The drive gear assembly 24 operates the film windup mechanism of the camera through the joint 27 to windup the roll film. When the mechanism accomplishes its film windup operation, it is not driven and thereby the gear assembly 24 is stopped. Therefore, the planet gear 20 meshed with the lower gear 24b of the drive gear 24 is forced to again revolve, so that the engaging roller 36 swings the lever 33 in a counterclockwise direction and disengages the recess 37. By the swinging of the lever 33, the pin 38 limiting the movement of the contact 39a is moved so that the switch 39 permits the switching to a shutter releasing circuit from a motor control circuit. When the planet gear 20 further revolves, it is meshed with the internal teeth of the arc plate 30 as shown in FIG. 9. At this time the engaging roller 36 pushes the drive lever 34b to swing it in a counterclockwise direction. The drive lever 34b swings the shutter releasing lever 34a through the wire spring 43 and thus the pin 42 drives the shutter releasing mechanism of the shutter to accomplish a shutter releasing operation. After a series of operations of the planet gear 20 described above, it rotates apart from the arc plate 30 and becomes to be in a waiting condition for the next time of operation, i.e., the first condition as shown in FIG. 2.

In the device above described it has been illustrated that the film windup operation is accomplished before the shutter releasing operation for convenience of description, but it is a common practice that the shutter releasing operation is firstly performed.

With the embodiment of the invention, since, by one revolution of the planet gear 20 about the drive gear 12, the drive lever 34 for a shutter release mechanism and the drive gear assembly 24 for a film windup mechanism may be driven, in turn, the operating order of these separate mechanisms is securely kept, and these mechanisms are accurately operated in a predetermined timing. In the case of driving the film windup mechanism when the windup operation of the film is completed, a heavier load is applied to the drive gear assembly 24 to stop it, so that the planet gear 20 may be disengaged with the drive gear to start revolving. Accordingly, the construction of the mechanism for this aim is simple. In the case of driving the shutter releasing mechanism, the planet gear 20 is meshed with the internal teeth of the arc plate 30 to forcedly revolve, the engaging roller 36 carried with the planet gear 20 swinging the lever 34 for driving a shutter releasing mechanism. This results in an accurate operation and simple construction.

Both the means for operating the film windup mechanism and shutter releasing mechanism which are received in the casing allow the motor drive unit to have a simpler construction and a smaller size than the prior art device.

Figure 7:
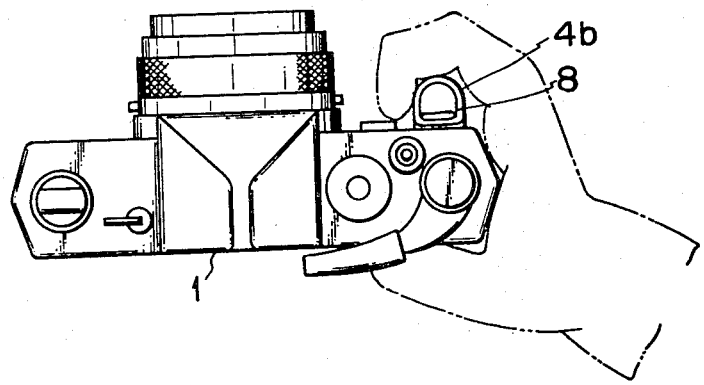
FIG. 7 is a plane view of the motor drive device as mounted on a camera.
Figure 8:
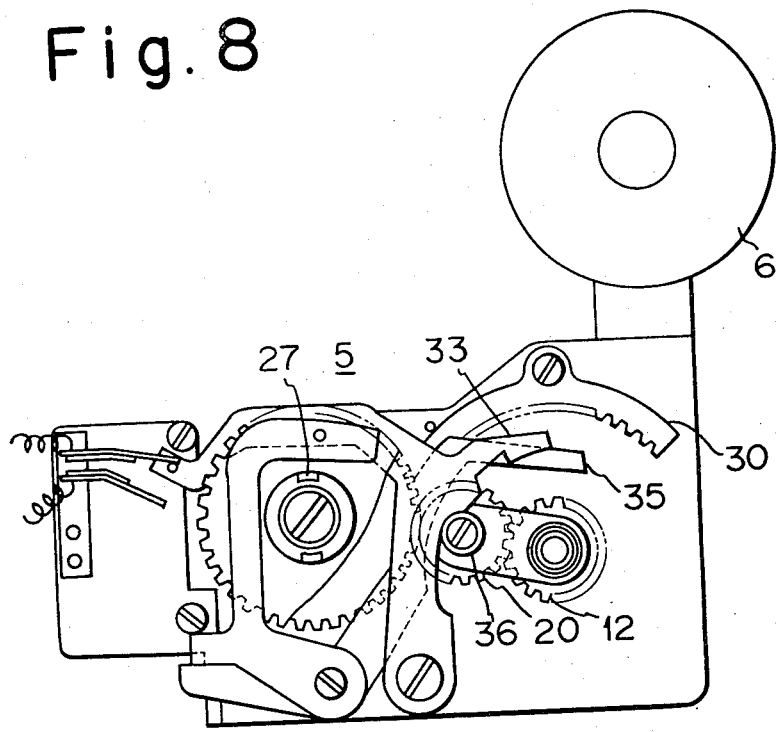
FIG. 8 is a plane view of the drive unit similar to the one shown in FIG. 2, except that a film windup mechanism is operated.

With the above described embodiment, where the drive unit 2 is mounted on the camera 1 by fitting the main casing 4a to the bottom surface of the camera through the bolt 7, the motor casing 4b is extended along the forward right edge of the camera as shown in FIG. 7. Therefore the camera 1 and motor casing 4b may be gripped by the right hand shown by two dots-dash lines and thus the motor casing 4b may be used as a grip with which fingers may be engaged, thereby enabling the operator to securely hold the camera with the drive device.

The switch button 8 mounted on the top of the motor casing 4b permits its easy operation by the forefinger of the hand gripping the camera.

In the device described above, when the planet gear 20 is revolved to a position where it should be engaged with the drive gear 24b or the toothed arc plate 30, the engagement of both members is sometimes not accomplished in a good condition. This defect may be obviated by mounting the drive gear 24 and arc plate 30 by means as shown in FIGS. 10 and 11.

Figure 10:
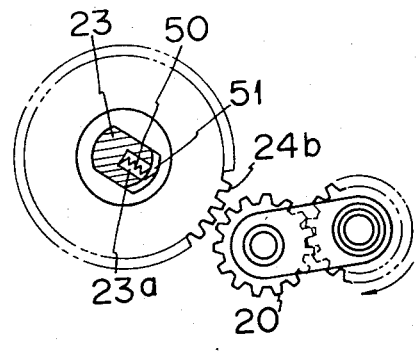
FIG. 10 is a plane view of a modification of the drive gear assembly.
Figure 11:
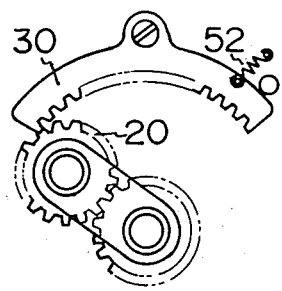
FIG. 11 is a plane view of a toothed arc plate which is urged by a spring.

As shown in FIG. 10, the supporting shaft 23 has opposite plane sides and curved sides. In one curved surface facing the engaging position of both gears 24b and 20 is formed a recess 23a in which a compression coil spring 50 is received. The lower gear 24b has a central opening 51 through which the shaft 23 is extended in such a manner that one end of the coil spring 50 is abutted on the inner side of the opening 51 to push the gear 24b on the engaging position thereby normally forming a clearance between the curved side of the shaft and the inner side of the opening 51.

With this construction, when the planet gear 20 is revolved to an engaging position the drive gear 24b is pushed in a direction of the arrow in FIG. 10 if both gears are not meshed by contacting of the tooth crests.

Alternately, to the right end of the toothed arc plate 30 is connected one end of a tension coil spring 52, the other end of which is fixed on the casing, so that the toothed arc plate 30 is normally urged in a counterclockwise direction about its pivoted center portion. When the planet gear 20 is contacted with the internal teeth of the left end of the arc plate 30, the plate 30 may be slightly rotated in a clockwise direction to perform a good engagement of both gears.

What is claimed is:

1. A motor drive device for a camera with a film windup mechanism and a shutter releasing mechanism, comprising:
   a casing having a main casing and a motor casing, the main casing being attachable to the bottom surface of the camera and the motor casing being disposed on one side of the front surface of the camera and extending along the side edge of the front surface, the motor casing being adapted to be grippable with the camera by hand;
   a motor received in the motor casing; and
   a drive unit accommodated in the main casing, the drive unit including a sun gear rotated by the motor, a planet gear meshed with the sun gear to rotate about its own axis and to revolve around the sun gear, a first means temporarily associated with the planet gear during a portion of the revolution of the planet gear around the sun gear to drive the film windup mechanism of the camera, and a second means temporarily associated with the planet gear during another portion of said revolution of the planet gear to drive the shutter releasing mechanism of the camera.

2. The motor drive device according to claim 1 which further includes a battery unit adapted to be connected to the drive unit.

3. The motor drive device according to claim 2 wherein the battery unit has a connecting portion at the top thereof adapted to be connected to the casing and a button switch for selectively electrically driving the motor.

4. The motor drive device according to claim 1 wherein the motor casing has a switch for selectively driving the motor at its top portion.

5. The motor drive device according to claim 1 wherein:
   the drive unit includes a connecting lever, one end of which is frictionally connected to the sun gear and the other end of which rotatably carries the planet gear, and an engaging roller mounted on the other end of the connecting lever to revolve with the planet gear; and
   the first means includes a first gear temporarily meshed with the planet gear to rotate therewith so as to drive the film windup mechanism and a first lever temporarily engaged with the engaging roller at its part, the planet gear rotating only around its own axis without revolving around the sun gear to rotate the first gear and to drive the film windup mechanism when the engaging roller is engaged with the first lever and when the planet gear is meshed with the first gear, the rotation of the first gear being stopped so that the planet gear is revolved around the sun gear to swing the first lever when the operation of the film windup is accomplished.

6. The motor drive device according to claim 5 wherein the first means further includes escaping means for elastically supporting the first gear so that when the teeth crests of the first gear and planet gear are abutted, the first gear is shiftable in a direction opposite to the abutted position, thereby preventing damage to the teeth of the first gear and planet gear.

7. The motor drive device according to claim 6 wherein the escaping means includes a compression coil spring one end of which is contacted to the first gear and the other end of which is fixed so as to elastically bias the first gear in its normal position.

8. The motor drive device according to claim 7 wherein said first gear is mounted on a shaft with a predetermined clearance therebetween to enable said first gear to move in a direction substantially perpendicular to the axis of said shaft, the fixed end of said compression coil spring being fixed to said shaft.

9. The motor drive device acording to claim 8 wherein said shaft has a recess therein for receiving a portion of said compression coil spring.

10. The motor drive device according to claim 1 wherein the drive unit has a connecting lever one end of which is frictionally contacted to the sun gear and the other end of which rotatably carries the planet gear, and an engaging roller mounted on the other end of the connecting lever to revolve with the planet gear; and the second means has a second gear temporarily meshed with the planet gear to forcedly revolve the planet gear, and a second lever swung by the engaging roller to drive the shutter releasing mechanism.

11. The motor drive device according to claim 10 wherein the second gear is an arc plate with internal teeth adapted to be meshed with the planet gear, the arc plate being pivoted at its center to be swingable about the center.

12. The motor drive device according to claim 11 wherein the second means further includes escaping means for elastically supporting the arc plate so that when the teeth crests of the arc plate and the planet gear are abutted, the arc plate is swingable in a direction opposite to the abutted position, thereby preventing damage to the teeth of the arc plate and planet gear.

13. The motor drive device according to claim 12 wherein the escaping means includes a tension coil spring one end of which is connected to one end of the arc plate and the other end of which is fixed so that it always urges the other end of the arc plate in the direction of the abutting position.

14. The motor drive device according to claim 1 wherein said second means is temporarily associated with the planet gear after the operation of the film windup mechanism.

* * * * *